US011430443B2

(12) United States Patent
Hall et al.

(10) Patent No.: US 11,430,443 B2
(45) Date of Patent: *Aug. 30, 2022

(54) DEVELOPER PLATFORM FOR PROVIDING AUTOMATED ASSISTANT IN NEW DOMAINS

(71) Applicant: Microsoft Technology Licensing, LLC, Redmond, WA (US)

(72) Inventors: David Leo Wright Hall, Berkeley, CA (US); Daniel Klein, Orinda, CA (US); David Ernesto Heekin Burkett, Berkeley, CA (US); Jordan Rian Cohen, Kure Beach, NC (US); Daniel Lawrence Roth, Newton, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 10 days.

This patent is subject to a terminal disclaimer.

(21) Appl. No.: 17/183,156

(22) Filed: Feb. 23, 2021

(65) Prior Publication Data

US 2021/0174803 A1    Jun. 10, 2021

Related U.S. Application Data

(63) Continuation of application No. 15/910,982, filed on Mar. 2, 2018, now Pat. No. 10,957,314.

(Continued)

(51) Int. Cl.
*G10L 15/22* (2006.01)
*G06F 40/35* (2020.01)
(Continued)

(52) U.S. Cl.
CPC ............ *G10L 15/22* (2013.01); *G06F 40/295* (2020.01); *G06F 40/35* (2020.01); *G06F 40/56* (2020.01);
(Continued)

(58) Field of Classification Search
CPC . G10L 15/22; G10L 15/1815; G10L 15/1822; G10L 2015/088
(Continued)

(56) References Cited

U.S. PATENT DOCUMENTS

2014/0380263 A1* 12/2014 Gabel ................... G06F 40/284
717/100
2017/0099360 A1*  4/2017 Levi ....................... G06F 16/955

FOREIGN PATENT DOCUMENTS

KR        20120137424 A  * 12/2012 ............. G06F 17/00

OTHER PUBLICATIONS

R. Sarikaya et al., "An overview of end-to-end language understanding and dialog management for personal digital assistants," 2016 IEEE Spoken Language Technology Workshop (SLT), San Diego, CA, 2016, pp. 391-397, doi: 10.1109/SLT.2016.7846294. (Year: 2016) (Year: 2016).*

(Continued)

*Primary Examiner* — Bharatkumar S Shah

(74) *Attorney, Agent, or Firm* — Alleman Hall Creasman & Tuttle LLP

(57) ABSTRACT

A system that provides a sharable language interface for implementing automated assistants in new domains and applications. A dialogue assistant that is trained in a first domain can receive a specification in a second domain. The specification can include language structure data such as schemas, recognizers, resolvers, constraints and invariants, actions, language hints, generation template, and other data. The specification data is applied to the automated assistant to enable the automated assistant to provide interactive dialogue with a user in a second domain associated with the received specification. In some instances, portions of the specification may be automatically mapped to portions of the first domain. By having the ability to learn new domains (Continued)

and applications through receipt of objects and properties rather than retooling the interface entirely, the present system is much more efficient at learning how to provide interactive dialogue in new domains than previous systems.

20 Claims, 7 Drawing Sheets

Related U.S. Application Data

(60) Provisional application No. 62/465,979, filed on Mar. 2, 2017.

(51) Int. Cl.
    *G06F 40/56*     (2020.01)
    *G06F 40/295*     (2020.01)
    *G10L 15/18*     (2013.01)

(52) U.S. Cl.
    CPC ...... *G10L 15/1815* (2013.01); *G10L 15/1822* (2013.01); *G10L 2015/223* (2013.01)

(58) Field of Classification Search
    USPC .......................................................... 704/257
    See application file for complete search history.

(56) References Cited

OTHER PUBLICATIONS

P. Milhorat, S. Schlögl, G. Chollet, J. Boudy, A. Esposito and G. Pelosi, "Building the next generation of personal digital Assistants," 2014 1st International Conference on Advanced Technologies for Signal and Image Processing (ATSIP), 2014, pp. 458-463, doi: 10.1109/ATSIP.2014.6834655. (Year: 2014).*

\* cited by examiner

DEVELOPER PLATFORM FOR PROVIDING AUTOMATED ASSISTANT IN NEW DOMAINS

CROSS REFERENCE TO RELATED APPLICATIONS

The present application is a continuation from U.S. patent application Ser. No. 15/910,982, filed on Mar. 2, 2018, which claims the priority benefit of U.S. provisional patent application Ser. No. 62/465,979, filed on Mar. 2, 2017, titled "Developer Platform for Dialogue," the entire disclosures of which are incorporated herein.

BACKGROUND

Voice interfaces are catching the attention of consumers the world over. Siri is available on Apple devices, Cortana is a Microsoft assistant, VIV offers a platform for developers which is like a chatbot, and Facebook offers support for chatbots of all kinds. These interfaces share the problem that each new application requires retooling the interface essentially from scratch, recording not only the application details, but also the language-dependent elements which have occurred in prior applications.

In the context of an automated assistant, which is a conversational system that allows person-to-machine communications in natural language, early technologies required large data or substantial hand tuning for each task that the system might accomplish. That is, the system for travel planning required its own rules and planning, independent of the application for banking or for finding restaurants and planning dinner.

What is needed is an improved automated assistant that is more easily configured for new domains and applications.

SUMMARY

The present technology, roughly described, provides a sharable language interface for implementing automated assistants in new domains and applications. A dialogue assistant that is trained in a first domain can receive a specification in a second domain. The specification can include language structure data such as schemas, recognizers, resolvers, constraints and invariants, actions, language hints, generation template, and other data. The specification data is applied to the automated assistant to enable the automated assistant to provide interactive dialogue with a user in a second domain associated with the received specification. In some instances, portions of the specification may be automatically mapped to portions of the first domain, while other portions of the specification may be mapped over time through learning or through input received from annotators or other sources. By having the ability to learn new domains and applications through receipt of objects and properties rather than retooling the interface entirely, the present system is much more efficient at learning how to provide interactive dialogue in new domains than previous systems.

The present system includes an automated assistant platform which allows the developer to leverage the language competence learned by previous applications, while taking advantage of the ease of integration of the automated assistant with data associated with a new application In embodiments, a method provides an automated assistant in multiple domains. The method includes receiving a specification for a second domain for an automated assistant, wherein the automated assistant configured with training data for a first domain. The specification can be applied to the automated assistant, the automated assistant utilizing the specification and the first domain. Interactive dialogue can be conducted with a user by the automated assistant based on the first domain and the applied specification.

In embodiments, a non-transitory computer readable storage medium has embodied thereon a program, wherein the program is executable by a processor to perform the method for providing an automated assistant in multiple domains.

In embodiments, a system includes a processor, memory, one or more modules stored in memory and executable by the processor to perform operations similar to the method described above.

DETAILED DESCRIPTION

The present technology provides a sharable language interface for implementing automated assistants in new domains and applications. A dialogue assistant that is trained in a first domain can receive a specification in a second domain. The specification can include language structure data such as schemas, recognizers, resolvers, constraints and invariants, actions, language hints, generation template, and other data. The specification data is applied to the automated assistant to enable the automated assistant to provide interactive dialogue with a user in a second domain associated with the received specification. In some instances, portions of the specification may be automatically mapped to portions of the first domain, while other portions of the specification may be mapped over time through learning or through input received from annotators or other sources. By having the ability to learn new domains and applications through receipt of objects and properties rather than retooling the interface entirely, the present system is much more efficient at learning how to provide interactive dialogue in new domains than previous systems.

In the present automated assistant, the systematic representation of the conversational details of the language are substantially independent of the representation of the application itself. This leads to the possibility that new developers may be supported by providing an API or other interface to the conversational language, and a different associated connection to a database which encompasses the details of the particular application to be designed.

The present system includes an automated assistant platform which allows the developer to leverage the language competence learned by previous applications, while taking advantage of the ease of integration of the automated assistant with data associated with a new application. The description of such a system may be found in U.S. patent application Ser. No. 15/298,475, titled "The Attentive Assistant, and U.S. patent application Ser. No. 15/328,448, titled "Interaction Assistant," the disclosures of which are incorporated by reference herein in their entirety.

Figure 1:
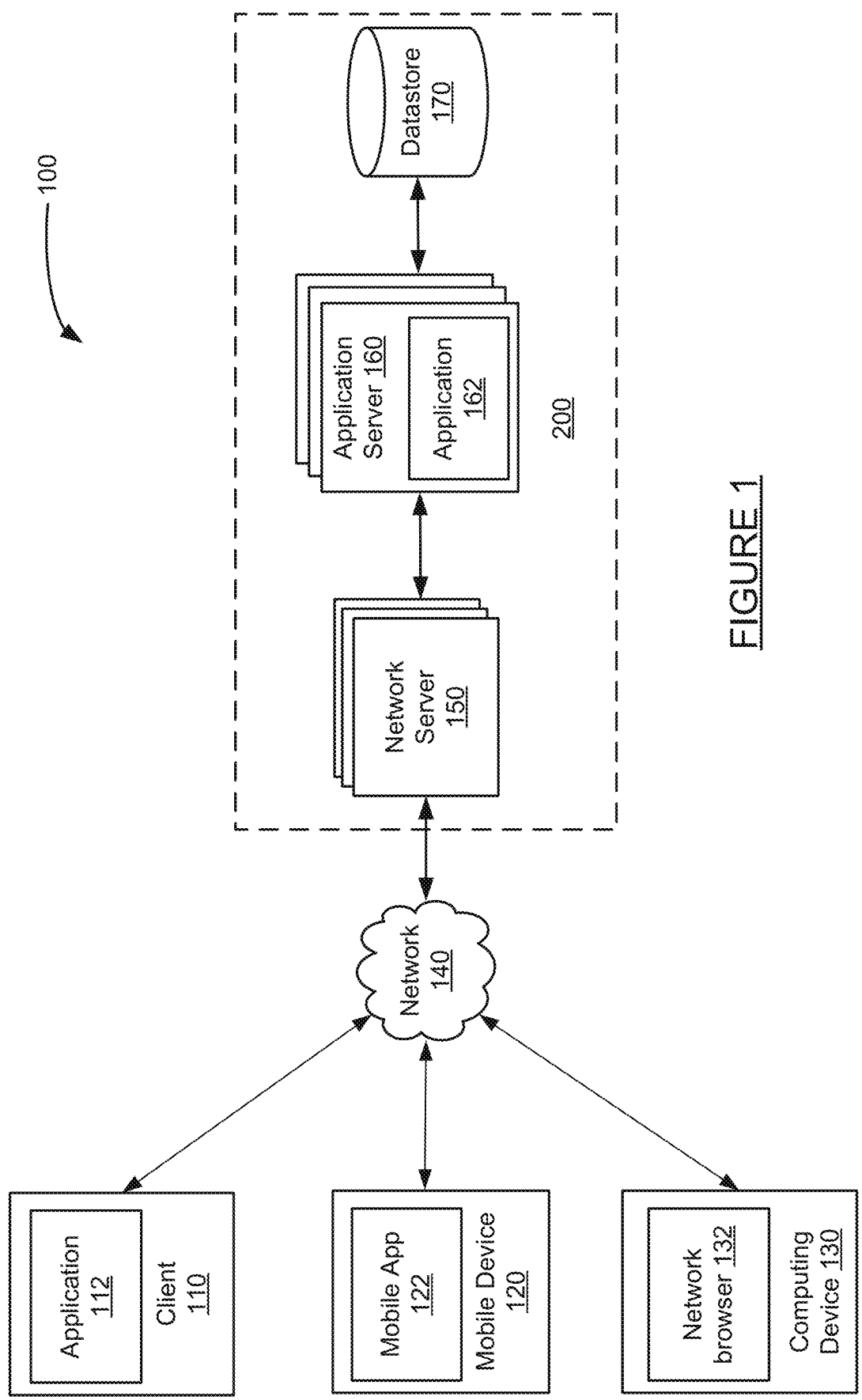
FIG. 1 is a block diagram of a system for providing an automated assistant that can be implemented in multiple domains.

FIG. 1 is a block diagram of a system for providing an automated assistant that can be implemented in multiple domains. System 100 of FIG. 1 includes client 110, mobile device 120, computing device 130, network 140, network server 150, application server 160, and data store 170. Client 110, mobile device 120, and computing device 130 communicate with network server 150 over network 140. Network 140 may include a private network, public network, the Internet, and intranet, a WAN, a LAN, a cellular network, or some other network suitable for the transmission of data between computing devices of FIG. 1.

Client 110 includes application 112. Application 112 may provide an automated assistant, TTS functionality, automatic speech recognition, parsing, domain detection, and other functionality discussed herein. Application 112 may be implemented as one or more applications, objects, modules, or other software. Application 112 may communicate with application server 160 and data stow 170 through the server architecture of FIG. 1 or directly (not illustrated in FIG. 1) to access data.

Mobile device 120 may include a mobile application 122. The mobile application may provide the same functionality described with respect to application 112. Mobile application 122 may be implemented as one or more applications, objects, modules, or other software, and may operate to provide services In conjunction with application server 160.

Computing device 130 may include a network browser 132. The network browser may receive one or more content pages, script code and other code that when loaded into the network browser the same functionality described with respect to application 112. The content pages may operate to provide services in conjunction with application server 160.

Network server 150 may receive requests and data from application 112, mobile application 122, and network browser 132 via network 140. The request may be initiated by the particular applications or browser applications. Network server 150 may process the request and data, transmit a response, or transmit the request and data or other content to application server 160.

Application server 160 includes application 162. The application server may receive data, including data requests received from applications 112 and 122 and browser 132, process the data, and transmit a response to network server 150. In some implementations, the network server 152 forwards responses to the computer or application that originally sent the request. Application's server 160 may also communicate with data store 170. For example, data can be accessed from data store 170 to be used by an application to provide the functionality described with respect to application 112. Application server 160 includes application 162, which may operate similar to application 112 except implemented all or in part on application server 160.

Block 200 includes network server 150, application server 160, and data store 170, and may be used to implement an automated assistant that includes a domain detection mechanism. Block 200 is discussed in more detail with respect to FIG. 2.

Figure 2:
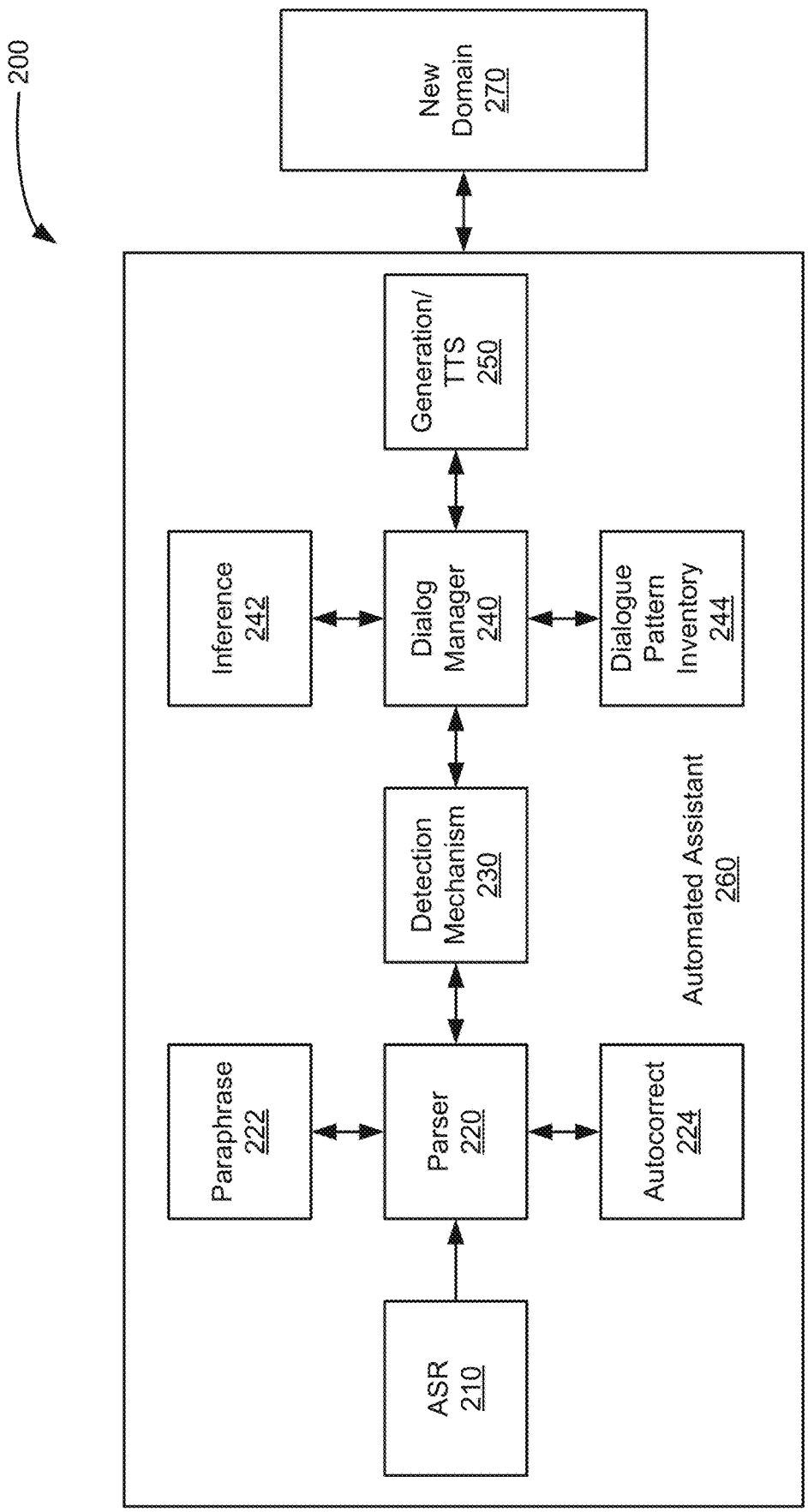
FIG. 2 is a block diagram of modules implementing an automated assistant application that can be expanded to operate in multiple domains.

FIG. 2 is a block diagram of modules implementing an automated assistant application that can be expanded to operate in multiple domains. The modules comprising the automated assistant application may implement all or a portion of application 112 of client 110, mobile application 122 of mobile device 120, and/or application 162 and server 160 in the system of FIG. 1.

The automated assistant application of FIG. 2 includes automatic speech recognition module 210, parser module 220, paraphrase module 22Z autocorrect module 224, detection mechanism module 230, dialog manager module 240, inference module 24Z dialogue pattern module 244, and text to speech (generation) module 250. Automatic speech recognition module 210 receives an audio content, such as content received through a microphone from one of client 110, mobile device 120, or computing device 130, and may process the audio content to identify speech. The ASR module can output the recognized speech as a text utterance to parser 220.

Parser 220 receives the speech utterance, which includes one or more words, and can interpret a user utterance into intentions. Parser 220 may generate one or more plans, for example by creating one or more cards, using a current dialogue state received from elsewhere in the automated assistant. For example, parser 220, as a result of performing a parsing operation on the utterance, may generate one or more plans that may include performing one or more actions or tasks. In some instances, a plan may include generating one or more cards within a system. In another example, the action plan may include generating number of steps by system such as that described in U.S. patent application No. 62/462,736, filed Feb. 23, 2017, entitled "Expandable Dialogue System," the disclosure of which is incorporated herein in its entirety.

In the conversational system of the present technology, a semantic parser is used to create information for the dialog manager. This semantic parser uses information about past usage as a primary source of information, combining the past use information with system actions and outputs, allowing each collection of words to be described by its contribution to the system actions. This results in creating a semantic description of the word/phrases Detection mechanism 230 can receive the plan and coverage vector generated by parser 220, detect unparsed words that are likely to be important in the utterance, and modify the plan based on important unparsed words. Detection mechanism 230 may include a classifier that classifies each unparsed word as important or not based on one or more features. For each important word, a determination is made as to whether a score for the important word achieves a threshold. In some instances, any word or phrase candidate which is not already parsed by the system is analyzed by reference to its past statistical occurrences, and the system then decides whether or not to pay attention to the phrases. If the score for the important unparsed word reaches the threshold, the modified plan may include generating a message that the important unparsed word or some action associated with the unparsed word cannot be handled or performed by the administrative assistant.

Dialog manager 240 may perform actions based on a plan and context received from detection mechanism 230 and/or parser 220 and generate a response based on the actions performed and any responses received, for example from external services and entities. The dialog manager's generated response may be output to text-to-speech module 250. Text-to-speech module 250 may receive the response, generate speech the received response, and output the speed to a device associated with a user.

Paraphrase module 222 may communicate with parser 222 to provide paraphrase content for words or phrases in the utterance received by parser 220. AutoCorrect module 224 may correct or suggest alternative spellings for words or phrases in the utterance received by parser 220.

Interference module 242 can be used to search databases and interact with users. The engine is augmented by per-domain-type sub-solvers and a constraint graph appropriate for the domain, and the general purpose engine uses a combination of its own inference mechanisms and the sub-solvers. The general purpose inference engine could be a CSP solver or a weighted variant thereof. In this context, solvers include resolvers, constraints, preferences, or more classical domain-specific modules such as one that reasons about constraints on dates and times or numbers. Solvers respond with either results or with a message about the validity of certain constraints, or with information about which constraints must be supplied for it to function.

Dialogue pattern module 244 may include domain independent and domain customized patterns that have been learned from past domains. The dialogue patterns may include one or more mechanisms for gathering constraints on a set of objects, for example for the purpose of pursuing a user intent. The dialogue patterns may also include command processing, for example to logic command towards an external process, list processing which reads emails or messages, play songs, and so forth, and list building such as for example keeping a grocery list, keeping annotations for a diary, creating an agenda for a meeting, and so on.

The Automated Assistant provides many of its services through a "UI toolkit" for dialog, including domain-independent and domain-customized patterns that have been learned from past experience. A partial set of such services for a UI toolkit are:

a. Winnow, which gathers constraints on some set of objects, often for the purpose of pursuing a user intent. Constraints may be explicit or implied, and may be hard (12 PM) or soft (next week, in the morning, cheap). Winnowing processes are common to booking a flight, buying a camera, finding a song to listen to, determining an airport from which to fly, and many other common tasks.

b. Command processing, which launches a command towards some external process. Command processing includes confirmation behavior, error handling, and suggestion/recommendation feedback especially for failed commands.

c. List processing: This includes reading emails or messages, playing songs on a list, forwarding reviews of a restaurant, and other similar feedback applications.

d. List building, including keeping a grocery list, keeping annotations for a diary, creating an agenda for a meeting, adding segments to a flight itinerary, and other functions.

Each of the UI toolkit elements are constructed in such a way that they have reasonable "default" behavior that may be tailored either via developer intervention or machine learning. For instance, Winnow may operate in a mode in which it asks the user for confirmation before returning the top option, or it may operate in a mode in which it doesn't, or it may ask the user to select between several options, or it might be better to summarize the available options and offer new constraints, or alternate searches.

Each of the UI toolkit offerings is built with many parameters. For instance, should the system always offer only the top choice? Should all (reasonable) choices be described? Should the element summarize the choices and offer alternate searches (or, in the case of a search without success, should the system guide a restatement or a refinement of the constraints?) Will the system automatically constrain the search with default entries, or should default entries be automatically overwritten by users' actions? If the system returns more than one option, is there a default ordering?

These dialog toolkit elements parameterize these different behaviors with a combination of developer-specified configuration and machine learning "features." Developer-specified configuration provides the default behavior for the particular instantiation of the ui element. For instance, in a flight-booking application, Winnow will likely be configured to confirm with the user before returning the flight. In this case, the developer would tell Winnow that it should be highly confirmatory. On the other hand, in a music-jukebox application, the system will likely return the song immediately (since likely the user wants to hear music, and not negotiate about which song), and thus in a "low confirmation" state.

New domain 270 represents specification data received by the automated assistant application to enable the automated assistant to conduct dialogue in the new domain. The new domain data may include schema, resolvers, invariants, constraints, recognizers, lexical hints, generation templates, training snippets, and other data. New domain data 270 is discussed in more detail below with respect to FIG. 3.

Additional details for an automated assistant application such as that of FIG. 2 are described in additional detail in U.S. patent application Ser. No. 15/792,236, filed Oct. 24, 2017, entitled "Sequence to Sequence Transformations for Speech Synthesis Via Recurrent Neural Networks," the disclosure of which is incorporated herein in its entirety.

A Developer Platform for Dialog

A platform for creating truly interactive dialog systems should provide these functions to the developer without requiring them to have PhDs in machine learning or linguistics. The platform described here enables this. Moreover, when using a platform like the one described here, the system has basic functionality immediately, without needing any additional training data. Rather, the system, using what it has learned from other domains or applications, can interpret the specification provided by the developer to immediately provide functionality not present on other platforms.

The components of the platform are described as applied to the development of two kinds of applications: "vertical" applications that more or less fit into a pre-existing domain, and "long tail" applications for domains that have not been built before. These are not necessarily categorical in the sense that a developer builds one or the other. Rather, they are illustrations of two extremes of a spectrum. Most deployments will contain aspects of both.

Vertical Applications

Vertical applications are those that are common enough that the platform includes specialized functionality that has been developed by the platform's own developers. For instance, the platform may contain pre-built functionality for banking or booking flights.

For an existing vertical application, or something close, "cards" in the system will exist which allow the system to "understand" the user, and to accomplish tasks. Thus one version of the Automated Assistant might understand how to book flights in the United States—it has cards for finding flights, negotiating prices, assigning seats, charging for baggage, and all of the other things one does when planning to travel in the United States.

When adding a vertical application for foreign air travel, the dataset for the foreign flights will have to be understood in terms of the dataset from US travel. Much of this is straightforward: airports in the US are like airports in Europe or Asia; Night times in the US are similar to flight times in US-Europe flights (except that more time zones are affected, and the arithmetic might have to be augmented to understand the International Date Line and other time discrepancies), Service codes are mappable, but one must understand that first class in the US is different that first class on Emirates Airlines. Some issues must be handled by augmenting the database and the card base, like handling passport requirements or vaccination and medical issues. The actual names of the airports affected will overlap with the US only application, but many overseas locations will have to be added to the database.

The mapping of one vertical database to another might be automated if the two data schema are similar, possibly with human assistance. That is, if the developer has a schema for a banking database, and the Automated Assistant already has a schema for a banking database, it should be very simple to automatically or manually mark corresponding elements, fields, and operations from the two databases. It will then be necessary to fill in missing operations and entities in the schema to fully coordinate the two vertical applications.

In addition, some language issues are common to all verticals. Pronoun reference in the conversation is very similar, and can be expected to span all applications. Time and date references will be common to most vertical applications, as will be more general terms like "earlier", "later", "more", and "less". Thus those issues which make the human-machine interaction more like a human-human interaction may be expected to transfer more-or-less seamlessly between vertical applications.

As in the original description of the present Automated Assistant, machine learning may be used to modify the system's internal parameters and learn appropriate weights so that the system will more likely respond correctly than not. New vertical applications will probably not be optimized for performance when first fielded, but they will improve rapidly as the verticals are exercised and the system responses are used to train the assistant.

The present system has basic functionality immediately, when used with the second domain based on the received specification, without needing any additional training data. Rather, the system, using what it has learned from other domains or applications, can interpret the received specification provided by the developer to immediately provide functionality not present on other platforms.

When a new domain is added, general features are automatically applied. If new capabilities are provided and their functions described, more specific weights for the system may be developed, and specialized actions may be taken in the new domain. In any case, the parameters of the automated assistant in a new domain can be refined either in a WoZ implementation with human operators, online via reinforcement learning, or they may be refined by analyzing and learning from system logs or other recordings of the operations of the system The components of the platform can be described as applied to the development of two kinds of applications: "vertical" applications that more or less fit into a pre-existing domain, and "long tail" applications for domains that have not been built before. These are not necessarily categorical in the sense that a developer builds one or the other. Rather, they are illustrations of two extremes of a spectrum. Most deployments will contain aspects of both.

Vertical Applications

Vertical applications are those that are common enough that the platform includes specialized functionality that has been developed by the platform's own developers. For instance, the platform may contain pre-built functionality for banking or booking flights.

For an existing vertical application, or something close, "cards" in the system will exist which allow the system to "understand" the user, and to accomplish tasks. Thus, one version of the Automated Assistant might understand how to book flights in the United States—it has cards for finding flights, negotiating prices, assigning seats, charging for baggage, and all of the other things one does when planning to travel in the United States.

When adding a vertical application for foreign air travel, the dataset for the foreign flights will have to be understood in terms of the dataset from US travel. Much of this is straightforward: airports in the US are like airports in Europe or Asia; flight times in the US are similar to flight times in US-Europe flights (except that more time zones are affected, and the arithmetic might have to be augmented to understand the International Date Line and other time discrepancies), Service codes are mappable, but one must understand that first class in the US is different that first class on Emirates Airlines. Some issues must be handled by augmenting the database and the card base, like handling passport requirements or vaccination and medical issues. The actual names of the airports affected will overlap with the US only application, but many overseas locations will have to be added to the database.

The mapping of one vertical database to another might be automated if the two data schema an similar, possibly with human assistance. That is, if the developer has a schema for a banking database, and the Automated Assistant already has a schema for a banking database, it should be very simple to automatically or manually mark corresponding elements, fields, and operations from the two databases. It will then be necessary to fill in missing operations and entities in the schema to fully coordinate the two vertical applications.

In addition, some language issues are common to all verticals. Pronoun reference in the conversation is very similar, and can be expected to span all applications. Time and date references will be common to most vertical applications, as will be more general terms like "earlier", "later", "more", and "less". Thus, those issues which make the human-machine interaction more like a human-human interaction may be expected to transfer more-or-less seamlessly between vertical applications.

Machine learning may be used to modify the system's internal parameters and learn appropriate weights so that the system will more likely respond correctly than not. New vertical applications will probably not be optimized for performance when first fielded, but they will improve rapidly as the verticals are exercised and the system responses are used to train the assistant.

"Long Tail" Applications

In a new domain, the developer will have somewhat more work to do, though the platform is designed in such a way that most of the required work is related to the description of objects in the domain and the "business logic" for how a user may interact with those objects.

We focus on the case of the analog to a CRUD application, which roughly characterizes a large fraction of existing software applications, and especially those that may be amenable to natural language interfaces. CRUD applications are any application that focuses mostly on providing an interface to one or more databases, such as address book management, flight booking, shopping, or recipe databases. (it should be emphasized that many of the components described here can apply to non-CRUD applications.)

Figure 3:
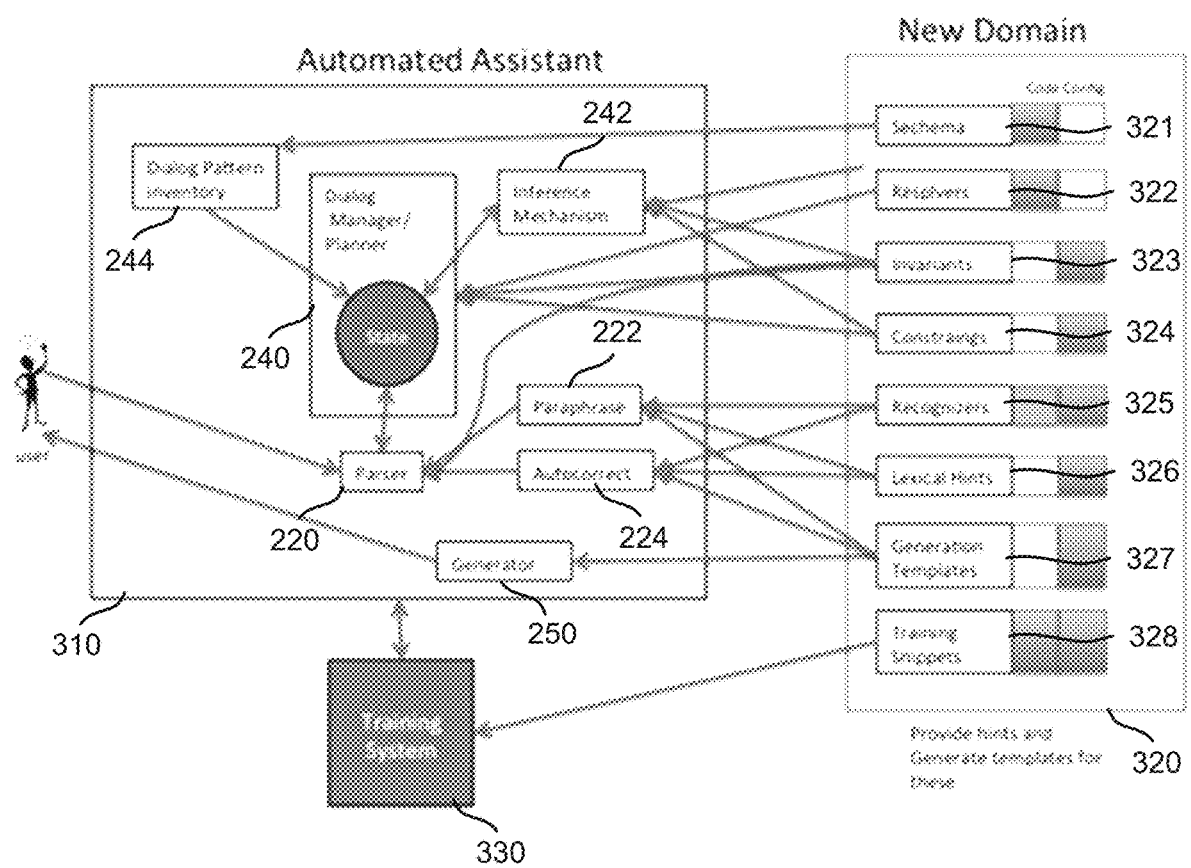
FIG. 3 is a block diagram of an automated assistant that receives data for new domain.

FIG. 3 is a block diagram of an automated assistant that receives data for new domain. As illustrated in FIG. 3, paraphrase module 222 may be may access and communicate with recognizers and lexical hints in order to perform paraphrasing on an utterance received by a parser 220. AutoCorrect module 224 may access and communicate with recognizers, lexical hints and generation templates to perform auto-correct tasks on portions of a parsed utterance. Interference mechanism 242 may access and communicate with schema, invariants, and constraint modules to search databases and interact with users while communicating with dialogue manager 240. Dialogue pattern module 244 may access and communicate with schema while communicating with dialogue manager 240. An output is generated by generator 240, which receives information from generation templates 327.

In general, a developer can define all or some of: schemas (the types of objects in the domain along with their properties), recognizers (which identify objects referred to in an utterance), resolvers (used for searching for domain objects based on constraints on their properties), actions (used for performing some external action such as booking a flight or deleting an email), invariants (used to assert relationships that are usually or always true), and constraints and/or preferences (used for restricting or ranking objects). In some instances, a seed set of trigger words or phrases can be used with these elements, though they may also be automatically induced from data.

Schemas

Schemas define the objects in the domain and the relationships between those objects. If developing a new movie recommendation domain, the developer would have to specify schemas for movies, directors, actors, ratings, etc. Schemas have properties, which are named fields with some type. (For instance, movies have ratings, directors, stars, durations, etc.) Many properties are likely to be based on predefined types (integers, strings, times, locations, etc.) or types from other domains.

The platform may be able to automatically import these schemas from a pre-existing database schema or another source by providing a function for automatically mapping between e.g. a SQL database and the platform's internal representation. Alternatively, the developer can define them in the platform's own internal representation directly.

Schemas enable many features of the system, such as question answering. By defining the schema for movies, the system can automatically answer questions like "How long is that movie?" by searching for an appropriate property with type "duration."

Certain object types may also have special functionality called traits that should be indicated to the platform. Examples include:
  Ordered. For instance, movie ratings have an ordering (an R-rated movie is more "adult" than a PG-rated movie).
  Monotonic. Some ordered properties of objects are also associated with a "quality" direction (a 5-star movie is, all else equal, better than a 4-star movie).
  Difference. Some types can have two objects compared in a way that tells the "difference" between them, Including types like money and timestamps. In general, the difference may not be the same type as the original objects. (For instance, the difference of two timestamps is a duration.)

Specifying these traits allows the system to automatically understand utterances like "5 hours longer", a "9 megapixel digital camera" (meaning one with at least 9 megapixels) or "nicer than that."

Recognizers

The developer may also provide a recognizer for certain types. Recognizers identify entities in language, e.g. from a user utterance. For instance in the movie domain, they might have to provide a recognizer for ratings or actors. Recognizers can be specified in one of several ways, including but not limited to:
  a simple keyphrase recognizer (e.g. recognizing ratings like "PG")
  a machine learning classifier that recognizes phrases or the context in which references to entities might occur.
  An enumeration of all or many objects in the domain, including example natural language references. For instance, the developer might provide a database of all movies or actors from something like IMDB. The developer may also specify if the listing is exhaustive or non-exhaustive.

Recognizers are used in the semantic parser of the system. Given a recognizer, the system can provide a spelling corrector and a paraphrase module. These modules automatically extend the system in such a way that it can learn that "Nwe York" means "New York", just as "Big Apple" does. In addition, for non-exhaustive enumerations, the system may attempt to automatically learn new examples, either through future user interactions or through other sources of data.

Inference Mechanisms

Many domains well-suited to dialog involve helping the user select one or more objects from a database by gathering requirements, executing searches, and combing through results. In the SM platform, this is accomplished by constructing a query graph representing the user's request(s) in terms of constraints or preferences about properties of objects, querying the database(s) and working with the user to refine the query or select the appropriate object(s).

The platform uses developer-provided resolvers, invariants, preferences, and constraints as modules in the assistant's underlying inference mechanism, which is essentially a weighted CSP solver (Reference), augmented with machine-learning or deep-learning modules to improve inference. The system can orchestrate these modules together with its own general purpose inference engine to compose sophisticated queries that no individual API supports.

Resolvers

The developer may provide a resolver, which converts the system query language (provided by the generic Automated Assistant) into API calls used to find entities that match the constraints in the query.

Given a query, a resolver should respond with one of the following:
  a set of results.
  an error indicating missing required properties,
  An error indicating that required properties are underconstrained (i.e. those properties that have insufficient constraints for the query to execute). For instance, a date field may only have the month specified, whereas the API needs a specific date.
  an error indicating that some invariant is violated, such as being unable to search for a movie showtime in the past.
  Other error types may be allowed to indicate a server timeout, etc.

Developers can also provide a declarative specification of the required properties and acceptable constraints on those properties that a given resolver needs or is capable of using. For instance, an API for flight search may require specific departure dates for all legs of the flight, and an optional upper bound on the cost of the itinerary.

In the preferred embodiment, resolvers need not ensure that all returned results satisfy all constraints. Instead, the underlying system can automatically apply all constraints post-hoc by filtering them. However, the resolver should specify which constraints in the query were used, so that the system can track when a set of results may become invalidated. (In some embodiments, the underlying platform API may be able to track this information automatically by recording which properties were accessed.)

Resolver may also be created for Constraints (discussed below) that may need to query an external database or perform compute in order for the system to evaluate it. For instance, an "place X near Y" constraint may need to query a mapping API in order to determine travel time between the two places.

Resolvers are used in the Planning module to determine the domains of variables and the extensions of constraints in the Inference module.

Invariants

The developer may specify invariants that must be true or usually are true about objects in the domain. For instance, the developer may specify that the departure time of a outgoing flight is always before that of the returning flight. Invariants may either be declared explicitly in the specification, or they may be returned as an error by a resolver. They may also be hard, or soft.

In addition, invariants may be specified in one of two ways: either through a formal language, or through natural language. Examples of the formal language include:
 ALWAYS
  (itinerary.outgoingDepartureDate<itinerary.returning DeperatureDate)
 USUALLY(itinerary.departureLocation=user.location)
Examples of natural language invariants include:
 The outgoing departure is always prior to the returning departure
 The departure point for a flight plan is often the user's location
 The arrival point for a flight plan is rarely the user's location
 Most users buy only one flight in any planning session
 Users generally prefer to depart between around 8 am and 6 pm.

For instance, the system can avoid interpreting "returning on the 3rd" as February 3rd if the trip begins on February 20th. Invariants are also used in the Inference system. Or the planner may assume that the user's departure point is near their current location rather than asking the user.

Constraints and Preferences

While there is a large preexisting database of constraints (e.g. inequality, substring matching, location-contained-within-region) used for specifying invariants and for use in querying, the developer may provide their own domain-specific constraints. Constraints operate similarly to resolvers, in that they are invoked by the inference mechanism and may make external calls. However, instead of returning a set of values for a single variable, they instead may either return a joint representation of all possible satisfying combinations of arguments, or they may filter or restrict the domains of the existing arguments. As a special case, they must be able to say whether or not a given configuration of arguments is permissible.

Functions are just a special class of constraints that are computable based on all but one argument. These may be specially represented in the platform API.

Natural language descriptions of constraints are mapped to this inventory of templates using a semantic parser similar to (or even identical to) the one the system uses in user interactions. The developer may further customize the shape of the curve to better suit their intentions, or to customize it to their domain.

In any event, for soft constraints, the system may treat these cost curves as an a priori guess as to the shape of the curve. The system may learn more precise or user-specific variants of these curves, via, e.g., adjusting the control points of a piecewise composition, or by adjusting the height of the shape, or changing the shape of the curve altogether for another more suitable shape. It does so via using the same learning regimes described in Ser. No. 15/298,475, The Attentive Assistant and Ser. No. 15/328,448 Interaction Assistant patents. The amount of freedom the system has (if any) in the changes it makes may be set by the developer as well. In the preferred embodiment, the system uses the parameters describing these curves as inputs along with constraint's arguments and possibly other contextual information (e.g. the context the soft constraint is instantiated in, and/or a user-specific configuration vector) to a feed-forward neural network that is trained to estimate the cost of those arguments directly.

The system is also able to use (and the developer is able to provide) constraints that may be violated for some cost and that may have differing degrees of violation (such as "in the morning"). These violable constraints are called preferences. The system has a pre-defined (but optionally expandable) library of preference "shapes," ranging in complexity and power. The most basic shape is of course the "is the condition precisely true" constraint, which has some fixed cost if it is false and no cost if it is true.

Ordered or arithmetic data types that support ranges and inequalities accommodate more sophisticated shapes: the soft constraint "morning" may be represented as a cost curve with a low or zero cost between the hours of, say, 6 am and noon, rising slowly from 6 am back to 3 am, and perhaps quite quickly after noon. (These may be stitched together from simpler curves and a "piecewise" compositor.) Still other constraints may be available for string types (e.g. approximate matches like edit distance) or other types.

A final concept is constraint complexes, which are collections of constraints or preferences that typically go together. The developer may describe constraint complexes that bundle together several (hard or soft) constraints. These complexes may be defined and named using natural or formal language, similar to individual properties or constraints. For example:
 A "round-trip" itinerary is one with exactly two legs, where the first leaves from the same airport the second arrives at, and vice versa.
 A "honeymoon" usually entails a romantic hotel, a larger room type, and airfare for two.

Constraints, functions, and preferences are used in the system's Planning and Inference modules. In the inference module, they are used as the constraints or factors in the underlying (soft) constraint satisfaction problem. In the planning module, they are used to generate proposals involving system initiative and repair. (E.g., the system can ask "is this a round-trip?" in lieu of asking how many legs in the flight them are.)

Actions

Tasks such as playing a song or purchase a camera are achieved through actions. The tasks are encoded as actions in the present system, and are the concept in the platform most similar to intents in traditional NLI platforms. An action is simply a function (or API call) that takes certain arguments, some of which may be optional.

The developer may also differentiate between actions which commit resources outside the Automated Assistant system, and those which are system internal. External actions (like booking a flight) are difficult to correct, and some may commit the user to spend resources which may be hard to recover, like money or votes. Internal actions tend to be easily correctable, and do not generally commit the user's resources. Thus actions may be graded from "dangerous" to "trivial", and the business rules for an application should indicate the impact to the user. One way the system may use the "danger level" of an action is to require explicit confirmation for dangerous actions (such as booking a flight), while allowing trivial interactions without confirmation (such as playing a song). Other intermediate situations may also be indicated, requiring confirmation if the system's confidence is insufficiently high (e.g., for sending an email).

Actions are used in the system's Planning module and in the Services module, which may be implemented within a dialogue manager module.

Language Hints

Previous platforms depend on the developer to provide them with explicit training pairs of (utterance, produced intent). While this is a rich source of data and the currently described platform supports it, annotating this data can be onerous and difficult, especially for longer dialogs.

Language hints are used both by the system's semantic parser and the system's generation module. They form the basis of the domain's grammar by hinting to the system that a given sequence of words is associated with a concept in the domain. (For the parser, they can be simply used as "trigger phrases" for the relevant concepts.) In addition, the system can generalize based on these hints by feeding them to a paraphrase module together with user utterances.

Explicit Language Hints

The developer may associate each entity type with "nominal" words or phrases, used for referring to generic objects of that type. For instance, they may say that an itinerary might be referred to as a "flight" or "trip", or that a movie might be referred to as a "movie", "flick" or "show".

Language hints may also be provided to aid identification of actions, properties, and constraints. For instance, the developer may associate the "BookItinerary" action with words like "book", "buy", "reserve", or "request". Or they may say that the first leg of an itinerary is the "outgoing" itinerary.

Generation Templates

The system also needs to know how to describe existing objects or searches for objects. While this may be learnable from data, it is also usually possible to explain to the system how to refer to an object of a given domain. As an example, consider the following example for movies:

```
{
  "type": "movie"
  "title": "title",
```

```
  "suffixes": [
    {"property": "year", "gen": "($1)"},
    {"property": "director", "gen": "directed by $1"},
    {"property": ["actors", 0]: "gen": "starring $1"}
  ]
}
```

This specification tells the system that it may describe a movie using phrases like "Indiana Jones and the Temple of Doom (1984) directed by Steven Spielberg and starring Harrison Ford" and a search for movies with phrases like "movies directed by someone with last name Lucas".

Despite the name, generation templates may also be used to aid in semantic parsing and interpretation. The above template tells the system that "directed by" is associated with the director property.

Training Data

Example utterances from the new domain may be listed with the appropriate system actions, and possibly with the updated query that should be created after each utterance or sequence of utterances.

Automatically Inferred Hints

One important source of language hints is the domain specification itself. Because programs and configuration are (hopefully!) written by humans in such a way that humans can read them later on, there is a large amount of linguistic information present already without needing additional, explicit linguistic information in the form of trigger lists or training data.

For example, hints for schema properties may be inferred automatically from the name of the property. For instance, a field named outgoingDepartureTime easily maps to "outgoing departure time," just as a field named "movie_rating" maps to "movie rating". In these cases, other possible paraphrases may be provided by the user. In other cases, the system may have more trouble automatically inferring a natural language description of a field. For example, scrnSizeDiag—a field indicating the diagonal length of a television screen—may be outside of the platform's automated inferential capacity. In this case, the developer will have to provide a mapping to a phrase like "screen size", which the system understands.

Language hints for actions, constraints, preferences, and constraint complexes can be derived similarly. For example, the action named "BookItinerary" may be analyzed to accept "book" as a trigger.

In the present automated assistant, there are a collection of language primitives and other language relationships which are common to all applications. These relationships are sometimes the "meaning" of certain nouns and verbs. For instance, the "meaning" of 5/4/45 is May 4, 1945, and the "meaning" of "I'd like to book a flight" is that there is a flight planning dialog which should be summoned, and the details of the flight should be provided to the planner so that a flight ticket may be purchased.

In the present system, one an intent is associated with a "card" (a plan for some workflow), then the system understands how to resolve any unset, coarsely understood, or alternate information required by that workflow. These resolution dialogues ("did you mean Boston?", "from which airport would you like to leave?", "Which New York airport would you like to fly from: LaGuardia, Newark, or Kennedy?") are already part of the language implementation of the system, except for the particular elements (airports in this case), which are enumerated in the application database.

That is, in the airport system the automated assistant knows how to ask for the user preference of an airport, while in a banking application the same language code would be used to ask for the preference for a bank, or for a particular account. While the "cards" for the system will be different (booking a flight is different than transferring money) in each case common protocols will be used to elicit choices from the user, to capture assignments offered by the user, and to fill in the unknown spaces in the card to be executed.

A high-level card In the present system is roughly equivalent to an "intention" of the user of the system. Thus, a card at the highest level of the "book a flight" application understands that it must know a departure and arrival airport, rough times for flights, class of service, number of passengers, and constraints on connectivity and number of passengers. There may also be softer constraints on price, time, type of aircraft, and company which is flying the aircraft. In the card for "transferring funds" the user (with the help of the system) must specify the bank, the account in which funds now exist, the account into which the funds must go, the amount, and the rough time of the transfer. Optional constraints may be on the currency of the transferred funds, and the detailed time at which the transfer should be accomplished. In either case, the user of the system must either indicate the category and identity of each required entity for the card, must accept the elements which are filled in automatically, or it must interact with the system to fill in all required fields before the card is executed.

Figure 4:
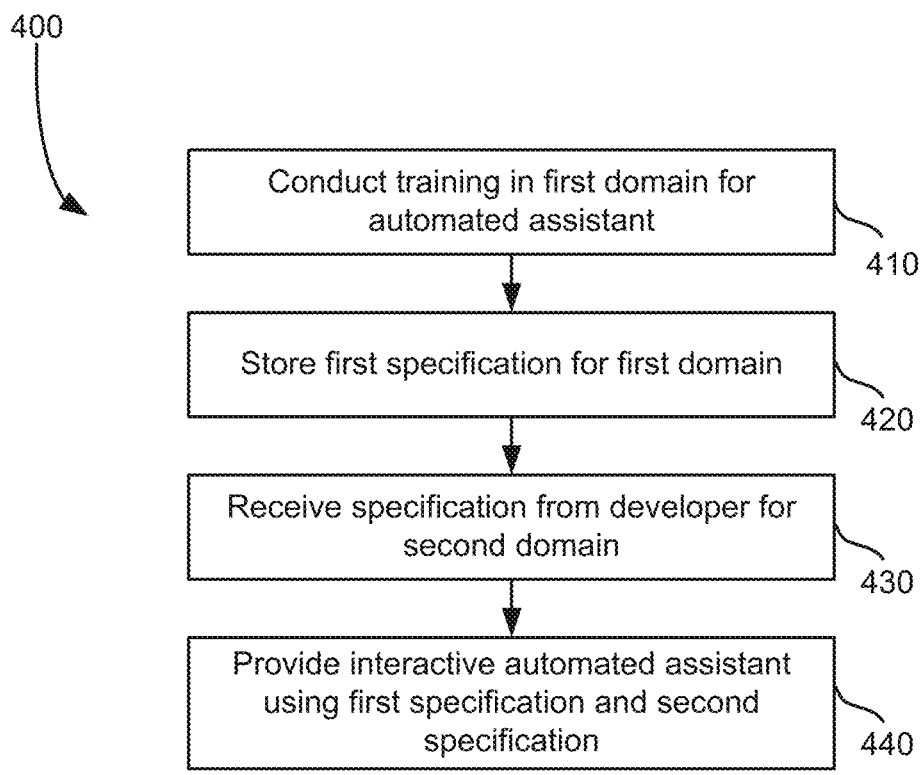
FIG. 4 is a method for providing an interactive automated assistant in multiple domains.

Operation of the automated assistant application of the present technology will not be described with reference to FIGS. 4-6. FIG. 4 is a method for providing an interactive automated assistant in multiple domains. Training is conducted in a first domain for an automated assistant at step 410. The training may include training data for a first domain and may result in generating and/or learning of specification features such as schema, resolvers, Invariants, constraints, recognizers, lexical hints, generation templates, and other data that define a language structure for the first domain. The first specification data for the first domain is stored at step 420.

A specification may then be received by the automated assistant for a second domain at step 430. The specification may be received from a developer, may be automatically generated by the automated assistant, or a combination of the two. More details for receiving a specification for a second domain is discussed with respect to the method of FIG. 5.

An interactive automated assistant is provided using the first specification and the second specification at step 440. Providing the interactive automated assistant may include applying features from the first domain and new features from the second domain. This is discussed in more detail with respect to the method of FIG. 6.

Figure 5:
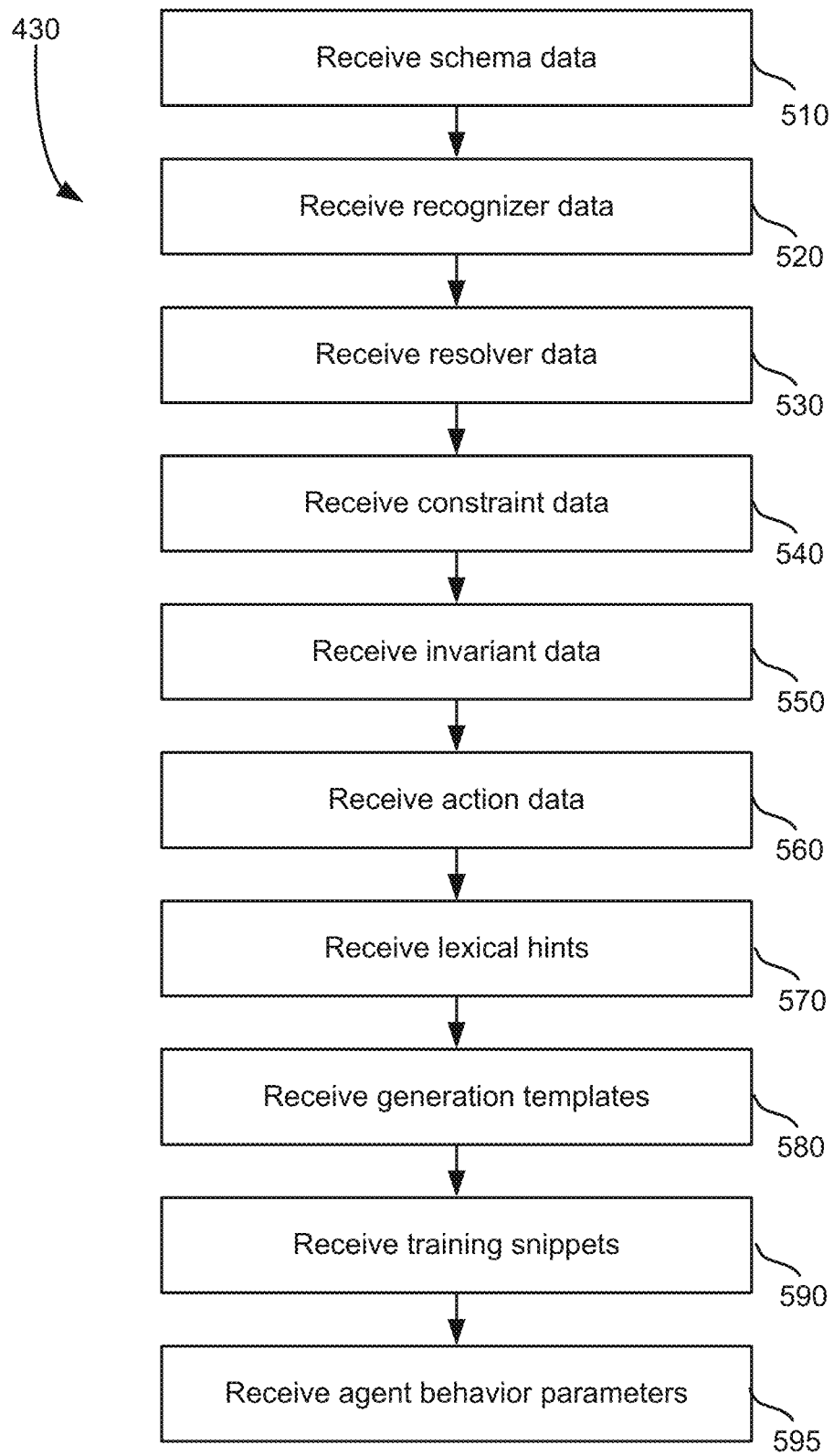
FIG. 5 is a method for receiving a specification for a second domain.

FIG. 5 is a method for receiving a specification for a second domain. The method of FIG. 5 provides more detail for step 430 of the method of FIG. 4. First, schema data for a second domain is received at step 510. The schema data may include properties having named fields with a type. The schema may be automatically imported and may automatically be mapped to schema for a first domain. Recognizer data may be received at step 520. Recognizer data may identify entities within language. In some instances, the recognizers may be used in a semantic parser, for example in a auto-correct module and/or with a paraphrase module.

Resolver data may be received at step 530. The resolver may convert system query language into an application program interface (API) calls to find entities that match restraints in a query. Constraint data may be received at step 540 and invariants may be received at step 550. Invariants are elements that are true or usually true for certain objects in a domain.

Action data may be received at step 560. An action is a function that takes a certain argument and may commit external resources or internal resources. External actions can be difficult to correct, in some instances, and may be graded according to a level of risk they may pose. For example, external actions that perform an action with an external service may be graded as dangerous while an action that performs internal task may be graded as trivial. In some instances, selected grades for all grades of actions may be reported to a user before they are performed.

Lexical hints may be received at step 570 and generation templates may be received at step 580. Training snippets for the second domain may be received at step 590. Receiving training snippets along with other specification data rather than a full training set of data allows the present system to get up and running much more quickly on a second domain than systems that would require a full training data sets.

Agent behavior parameters may be received at step 595. Agent behavior parameters may indicate the formality of generated language, the size of a response, and other aspects. Developers can specify the personality of the automated assistant for a particular application through the behavior parameters. A partial list of potential agent characteristics includes:

a. Chatty—using a lot of words and informal speech for interactions b. Terse—using as few words as possible to maintain communications c. Humorous—using jokes or puns during the conversation d. Formal—requiring that the discussion always be focused on me topic, using only formal language.

e. Strictly verifying—verify all changes to the data in the application f. Strictly notifying—telling the user each time the data in the application is modified g. Standard verification—require verification for all non-local changes to data.

h. (more here)

The automated assistant can have some or all of these characteristics already coded. The developer can choose a completed personality or can assist in coding a new one or provide data exemplifying the new required personality for either manual or machine learning implementation.

Figure 6:
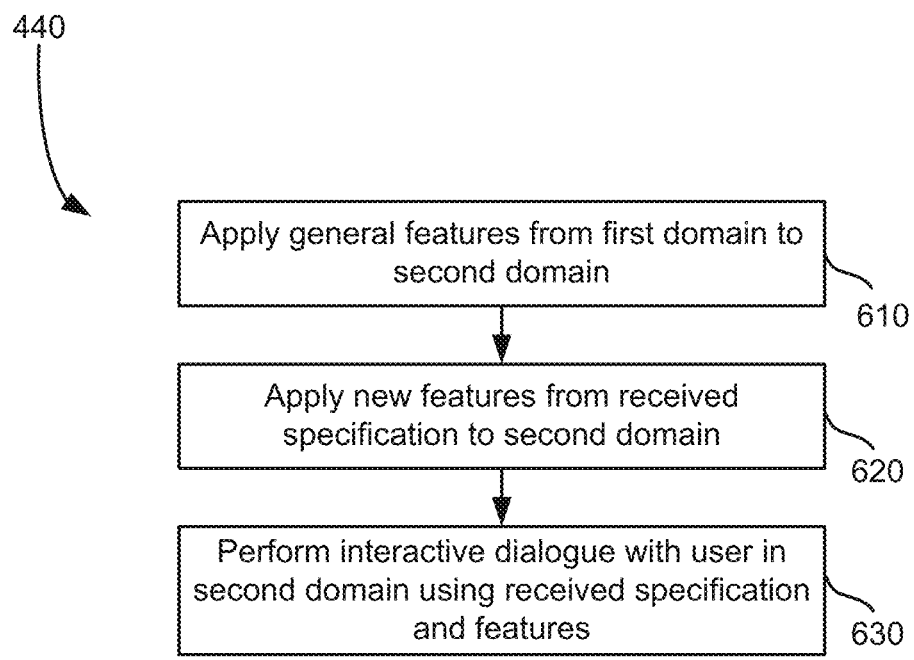
FIG. 6 is a method for providing an interactive automated assistant using it for specification and a second specification.

FIG. 6 is a method for providing an interactive automated assistant using it for specification and a second specification. The method of FIG. 6 provides more detail for step 440 the method of FIG. 4. First, general features from the first domain are applied to the automated assistant and second domain specification at step 610. New features from the received specification are then applied to the second domain at step 620. Interactive dialogue may be performed for the user in a second domain using the received specification and the features of the first domain at step 630. By providing domain objects and properties rather than intent and utterances, and automated assistant of the present technology may require much less training and more quickly be able to process dialogue and a second domain as opposed to systems of the prior art.

Planning

The Planning module is tasked with determining how the system will go about conducting the dialog and servicing the user's request(s). Roughly speaking, it looks at the dialog state (which includes a representation of the user's intent) and figures out what to do next, and what components of the system will service it.

In one embodiment, it can be implemented as a top-down weighted deduction system, where the system has a set of postconditions to satisfy as a goal (usually produced by external events including user utterances and internal actions), and the system uses deduction operators to find a solution. Goals include:

Handle(event) or Handle(utterance): process an incoming event

Execute(action): execute an external API call

Resolve(variable) or Resolve(constraint): a variable or constraint the CSP needs a domain or extension for.

Dialog Act goals including Inform(expr) and Confirm (expr), where expr is an abstract representation of a communication goal. These are typically handled via generation.

Choose(variable): the system requests picking or narrowing down a variable to a single or a few candidates from a known domain.

Update(expr): Update the system's internal representation using the results of, e.g., a parse.

Propose(expr) Propose instantiating a card, a constraint or a constraint template, etc.

Operators include:

The parser, which converts a user utterance into a set of further goals

Ignore, which suppresses events

Resolvers and Constraint Resolvers

Dialog patterns like Winnow, which handles Choose goals.

The Generator for handling Dialog Act goals.

Primitive operators for updating the state based on Update

Weights are learned automatically via the various learning mechanisms described elsewhere. The features involved look at operator identity, properties of the goal(s) including developer hints, the overall dialog state, user preferences, etc.

The system may also propose various execution strategies to the user, asking the user to confirm an option or to choose amongst options. These proposals might be to ask if the user wants to, e.g., find a hotel before finding a flight itinerary, or it could be used to "sanity check" an execution plan ("Do you really want to search for any airport in Australia?"). The user's response can be used as training data in much the same way as it is used for the rest of the dialog system: the system can assign features to its proposals and learn which one the user likely should take.

One difference, however, is that the system may take into account the costs of inference itself in addition to (its estimate of) the user's preference. In particular, certain execution strategies may be especially expensive from a computational, latency, or even financial point of view: some inference algorithms may be especially intractable, or may require accessing a slow database, or cost money for each query executed. The system can be configured to weigh these factors to decide which is appropriate in the circumstance, or to learn to maximize some utility function (e.g., the expected value of the user's eventual purchase). This idea is similar to that of https://cs.stanford.edu.-pliang/papers/onthejob-nips2015.pdf.

System Benefits from Shared Infrastructure

In the system described herein, a shared basic infrastructure both informs and learns from new domains, whether closely associated with previously enabled domains, or substantially divorced from previous experience. In each case, however, much of the dialog infrastructure and computational solution software will be common.

By sharing parameters for the features from developers' configuration of their individual domains, the system can learn the appropriate behavior for all domains, and improve the functionality of new domains before they have access to training data.

As the system matures, a large category of core types and interactions will make interoperability between applications very easy to accomplish. There will be an almost universal query/constraint language arising from the intersection of the various applications.

Thus, compared with pure, low knowledge "deep learning" solutions, this system takes advantage of information specific to each domain to enhance the overall system, allowing developers to create vertical applications with minimal effort, and enhancing the overall utility of the Automated Assistant for all users.

Example Domain Specification

As an example, consider the exemplary code below presents a toy version of a JSON specification for a domain for searching a movie database.

```
{
    "domain": "movies",
    "types": [
        {
            "name": "movie",
            "properties" : {
                "title" : { "type": "string", "triggers" : ["name"]},
                "release_year": "year",
                "director" : "person",
                "actors" : {"type": "array", "items" : "person"},
                "rating" : "rating",
                "critic_score": {"type": "float", "monotonic" : "positive", "triggers": ["reviews"]}
            },
            "paths": [
                {"path": ["stars", 0], "triggers": ["lead"]}
            ],
            "nominals": ["movie", "film", "flick", "show"],
            "generation": [{
                "title": "title",
                "suffixes": [
                    {"property": "year", "gen": "($1)"},
                    {"property": "director", "gen": "directed by $1"},
                    {"property": ["actors", 0]: "gen": "starring $1"}
                ]
            }
```

```
            }],
            "resolver": {
                "min arguments": 1,
                "arguments": [
                    {"field": "title", "required": false, "constraints": ["exact match", "approximate match"]},
                    {"field": ["director", "name"], "required": false, "constraints": ["exact match"]},
                    {"field": "critic_score", "required": false, "constraints": ["exact match", "upper bound", "lower bound"]}
                ]
            }
        },
        {
            "name" : "rating",
            "description": "an MPAA rating of a movie",
            "properties": {
                "name": "string"
            },
            "ordered": true,
            "exhaustive": true,
            "values": [
                { "value" : { "name": "G" } },
                { "value" : { "name": "PG" } },
                { "value" : { "name": "PG-13" } },
                { "value" : {"name": "R"} },
                { "value" : {"name": "NC-17" } }
            ]
        }
    ]
}
```

Benefits to the Developer

In some instances, by providing a domain specification, business logic, and some language hints, the developer gains access to a functional automated assistant with capabilities that current systems do not possess, despite having little or no "training data," per se. Of course, without data the system is not as robust as it will be, but it nevertheless has the following features "out of the box":
   a. Dialogs patterns including multiple strategies for gathering requirements, conducting searches, selecting options, error handling, and executing actions;
   b. Coreference resolution, including:
      i. recognition and use of pronouns for previously occurring entities or operations,
      ii. resolution of covert references, e.g. determining the appropriate entity for an utterance like "what's the price?" automatically
      iii. recognition and use of appropriate referring expressions;
   c. Paraphrase, seeded from language hints provided by the developer, used for broadening the analysis of user utterances and for making the automated assistant more personable;
   d. Spelling correction, based on a large lexicon, databases on which the automated assistant is trained, and new items from the new domain.
   e. Language generation, including parsimonious descriptions learned from training data and user interaction
   f. Multitasking, taking advantage of the software engineering interfaces provided in the automated assistant
   g. Interactivity with other domains, allowing users to intermix tasks, restart paused tasks, and search for necessary data from other domains.
   h. Clarification processes for correcting/confirming data based on the conversational processes of the Automated Assistant.
   i. Flexible inference engine that is capable of executing queries that would be cumbersome in a fixed graphical user interface, or in a naive implementation of a natural language interface The exemplary code defines a domain with two domain-specific types: movies and ratings. The developer has provided custom triggers (language hints) for the "title" property, and for the lead actor, present in the first entry in the actors field. Nominals are used as language hints for referring to an individual movie. These are used for intent detection and for recognizing and generating referring expressions. The developer has also provided a generation template for describing a movie. Using this generation template, the system can describe movies as, e.g., "Indiana Jones and the Temple of Doom (1984) directed by Steven Spielberg starring Harrison Ford". The system can also use this template to describe movies that have not yet been found, e.g. the system can describe a search for "movies starring Harrison Ford" using this same template. There is also a description of the requirements for the resolver for movies.

The rating type by contrast is an enumerated type, with all possible ratings specified inline in the specification. The enumeration is used as a recognizer. The developer has not specified any language hints for this type, and so triggers inferred from the specification's field names and default generation are used until better behavior can be learned from data.

Not included in the exemplary code is the actual code for executing the movie resolver, which is of course dependent on the underlying service API. This particular domain does not include any actions, but they are specified similarly to declaring a type that has a resolver, including required arguments (~properties) and triggers.

Figure 7:
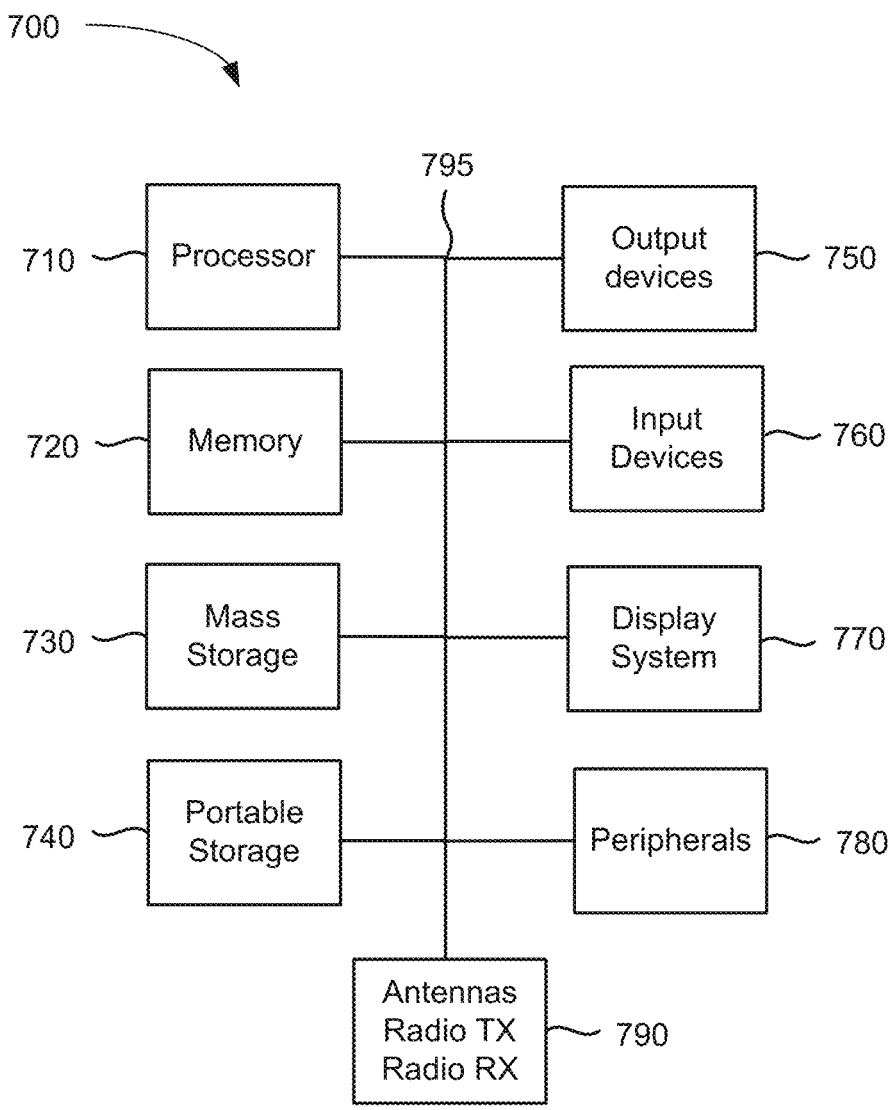
FIG. 7 is a block diagram of a computing environment for implementing the present technology.

FIG. 7 is a block diagram of a computing environment for implementing the present technology. System 700 of FIG. 7 may be implemented in the contexts of the likes of client 110, mobile device 120, computing device 130, network server 150, application server 160, and data stores 170.

The computing system 700 of FIG. 7 includes one or more processors 710 and memory 720. Main memory 720 stores, in part, instructions and data for execution by processor 710. Main memory 710 can store the executable code when in operation. The system 700 of FIG. 7 further includes a mass storage device 730, portable storage medium drive(s) 740, output devices 750, user input devices 760, a graphics display 770, and peripheral devices 780.

The components shown in FIG. 7 are depicted as being connected via a single bus 790. However, the components may be connected through one or more data transport means. For example, processor unit 710 and main memory 720 may be connected via a local microprocessor bus, and the mass storage device 730, peripheral device(s) 780, portable or remote storage device 740, and display system 770 may be connected via one or more input/output (I/O) buses.

Mass storage device 730, which may be implemented with a magnetic disk drive or an optical disk drive, is a non-volatile storage device for storing data and instructions for use by processor unit 710. Mass storage device 730 can store the system software for implementing embodiments of the present invention for purposes of loading that software into main memory 720.

Portable storage device 740 operates in conjunction with a portable non-volatile storage medium, such as a compact disk, digital video disk, magnetic disk, flash storage, etc. to input and output data and code to and from the computer system 700 of FIG. 7. The system software for implementing embodiments of the present invention may be stored on such a portable medium and input to the computer system 700 via the portable storage device 740.

Input devices 760 provide a portion of a user interface. Input devices 760 may include an alpha-numeric keypad, such as a keyboard, for inputting alpha-numeric and other information, or a pointing device, such as a mouse, a trackball, stylus, or cursor direction keys. Additionally, the system 700 as shown in FIG. 7 includes output devices 750. Examples of suitable output devices include speakers, printers, network interfaces, and monitors.

Display system 770 may include a liquid crystal display (LCD), LED display, touch display, or other suitable display device. Display system 770 receives textual and graphical information and processes the information for output to the display device. Display system may receive input through a touch display and transmit the received input for storage or further processing.

Peripherals 780 may include any type of computer support device to add additional functionality to the computer system. For example, peripheral device(s) 780 may include a modem or a router.

The components contained in the computer system 700 of FIG. 7 can include a personal computer, hand held computing device, tablet computer, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Apple OS or iOS, Android, and other suitable operating systems, including mobile versions.

When implementing a mobile device such as smart phone or tablet computer, or any other computing device that communicates wirelessly, the computer system 700 of FIG. 7 may include one or more antennas, radios, and other circuitry for communicating via wireless signals, such as for example communication using Wi-Fi, cellular, or other wireless signals.

While this patent document contains many specifics, these should not be construed as limitations on the scope of any invention or of what may be claimed, but rather as descriptions of features that may be specific to particular embodiments of particular inventions. Certain features that are described In this patent document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

The invention claimed is:

1. A method for providing an automated assistant for a specific domain, comprising:
receiving a domain-specific specification including a description of a constraint for the automated assistant, the automated assistant previously trained with training data corresponding to the domain-specific specification;
using a previously-trained semantic parser to map the description of the constraint to a constraint template; and
enabling the automated assistant to conduct interactive dialogue based on the constraint template and general features derived from the previous training with the training data and domain-specific features for a domain indicated in the domain-specific specification.

2. The method of claim 1, wherein the training data is for a first domain and wherein the domain-specific specification is for a second domain different than the first domain.

3. The method of claim 1, further comprising recognizing an application programming interface (API) request to extend the automated assistant with a new action based on the description of the constraint.

4. The method of claim 3, further comprising outputting a description of the new action based on the description of the constraint.

5. The method of claim 1, further comprising recognizing an application programming interface (API) request to ask a user a clarifying question based on the description of the constraint, and using the previously-trained semantic parser to extract disambiguating information from a user utterance based on the description of the constraint.

6. The method of claim 1, wherein the description of the constraint is a natural language text string.

7. The method of claim 6, wherein the previously-trained semantic parser includes a natural language model and wherein mapping the description of the constraint to the constraint template is based on parsing the natural language text string using the natural language model.

8. The method of claim 7, wherein conducting the interactive dialogue includes receiving a user query, using the previously-trained semantic parser to map the user query to a user constraint by parsing the user query with the natural language model, and outputting a response based on the user constraint and the constraint template.

9. The method of claim 1, wherein conducting the interactive dialogue includes determining a user constraint based on a user query, and outputting a response based on the user constraint and the constraint template.

10. The method of claim 9, wherein outputting the response based on the user constraint includes generating an application programming interface (API) request to retrieve information about an entity that matches the user constraint according to the constraint template.

11. The method of claim 9, wherein the response based on the user constraint includes a set of candidate results, each candidate result in the set of candidate results satisfying the user constraint according to the constraint template.

12. The method of claim 11, wherein the constraint template defines a cost curve based on the description of the constraint, the cost curve indicating a range of satisfactory costs for different candidate results in the set of candidate results.

13. The method of claim 12, wherein the constraint template includes a violable constraint, and wherein the constraint template is satisfiable when the violable constraint is violated and the cost for violating the violable constraint is within the range of satisfactory costs.

14. The method of claim 12, wherein the cost curve is a user-specific cost curve.

15. The method of claim 9, wherein the response based on the user constraint includes an error indicating the user constraint could not be satisfied according to the constraint template.

16. The method of claim 15, wherein the error is based on an incompatibility between the user constraint and an invariant specified by the constraint template.

17. The method of claim 16, wherein the invariant is a formal language invariant.

18. The method of claim 16, wherein the invariant is a natural language invariant.

19. A method for providing an automated assistant for a specific domain, comprising:
receiving a domain-specific specification including a natural language text string describing a constraint for the automated assistant, the automated assistant previously trained with training data corresponding to the domain-specific specification;
using a previously-trained semantic parser including a natural language model to parse the natural language text string using the natural language model and to generate a constraint template based on the parsed natural language text string; and
enabling the automated assistant to conduct interactive dialogue based on the constraint template and general features derived from the previous training with the training data and domain-specific features for a domain indicated in the domain-specific specification.

20. A method for providing an automated assistant for a specific domain, comprising:
receiving a domain-specific specification including a description of a constraint for the automated assistant, the automated assistant previously trained with training data corresponding to the domain-specific specification, wherein the training data is for a first domain and wherein the domain-specific specification is for a second domain different than the first domain;
using a previously-trained semantic parser to map the description of the constraint to a constraint template; and
enabling the automated assistant to conduct interactive dialogue based on the constraint template and general features derived from the previous training with the training data and domain-specific features for a domain indicated in the domain-specific specification.

* * * * *